United States Patent
Xiong et al.

(10) Patent No.: US 10,245,945 B2
(45) Date of Patent: Apr. 2, 2019

(54) DRIVING DEVICE AND WHEELED ROBOT HAVING THE SAME

(71) Applicant: UBTECH Robotics Corp., Shenzhen (CN)

(72) Inventors: Youjun Xiong, Shenzhen (CN); Libing Zhou, Shenzhen (CN); Youpeng Li, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 68 days.

(21) Appl. No.: 15/644,808

(22) Filed: Jul. 9, 2017

(65) Prior Publication Data

US 2018/0334029 A1 Nov. 22, 2018

(30) Foreign Application Priority Data

May 19, 2017 (CN) .......................... 2017 1 0355365

(51) Int. Cl.
*B60B 19/00* (2006.01)
*B60K 17/24* (2006.01)
*B62D 61/06* (2006.01)

(52) U.S. Cl.
CPC ............ *B60K 17/24* (2013.01); *B60B 19/003* (2013.01); *B62D 61/06* (2013.01); *B60Y 2304/07* (2013.01)

(58) Field of Classification Search
CPC ...... B60K 17/24; B60B 19/003; B62D 61/06; B60Y 2304/07
See application file for complete search history.

(56) References Cited

U.S. PATENT DOCUMENTS

| | | | | |
|---|---|---|---|---|
| 5,374,879 A | * | 12/1994 | Pin | .......................... B25J 5/007 180/21 |
| 6,340,065 B1 | * | 1/2002 | Harris | ................... B60B 19/003 180/20 |
| 8,944,446 B1 | * | 2/2015 | Cottingham | .......... B60B 19/003 180/252 |
| 9,809,056 B1 | * | 11/2017 | Rembisz | ................. B60B 19/12 |
| 2009/0299525 A1 | * | 12/2009 | Takahashi | ............. B60B 19/003 700/258 |
| 2010/0049388 A1 | * | 2/2010 | Moriguchi | ........... G05D 1/0227 701/22 |
| 2015/0266528 A1 | * | 9/2015 | Matsue | ................ B60G 17/016 180/7.1 |

FOREIGN PATENT DOCUMENTS

CN 106585363 A * 4/2017

* cited by examiner

*Primary Examiner* — Drew J Brown

(57) ABSTRACT

A driving device of a robot includes at least one driving assembly and a fixing assembly that are arranged outside a base of the robot. The at least one driving assembly includes a motor, an omnidirectional wheel, a connection shaft used to connect an output shaft of the motor to the omnidirectional wheel, and a connection assembly used to connect the connection shaft to the motor and the omnidirectional wheel. The motor, the connection shaft and the omnidirectional wheel are arranged along a radial direction of the base, and the fixing assembly is used to fix the motor to the base of the robot.

19 Claims, 6 Drawing Sheets

DRIVING DEVICE AND WHEELED ROBOT HAVING THE SAME

CROSS REFERENCE TO RELATED APPLICATIONS

This application claims priority to Chinese Patent Application No. 201710355365.X, filed May 19, 2017, which is hereby incorporated by reference herein as if set forth in its entirety.

BACKGROUND

1. Technical Field

The present disclosure generally relates to the field of robotics, and particularly to a driving device and a wheeled robot.

2. Description of Related Art

A conventional driving device for wheeled robots typically includes a motor arranged inside the base of the robot and omnidirectional wheels driven by the motor. The wheels as driven by the motor can roll on a surface, such as ground. When the motor needs to be replaced/repaired, it needs to first disassemble the base of the robot, which is not conducive to the maintenance of the robot.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
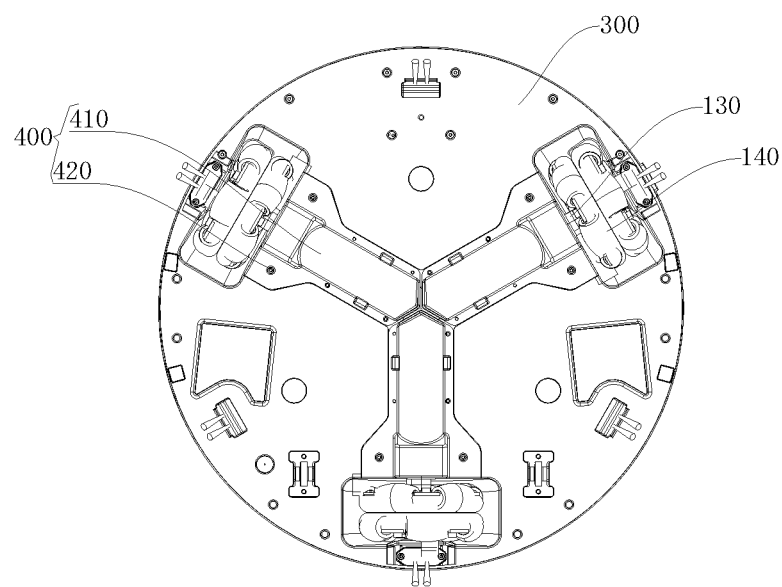
FIG. 1 is a planar bottom view of a driving device for a wheeled robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
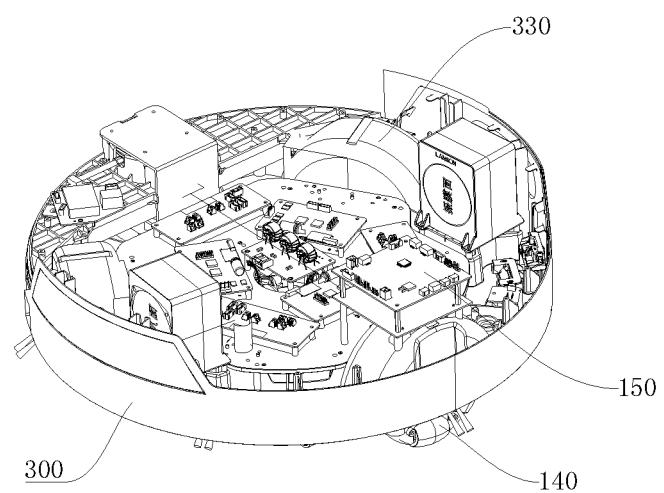
FIG. 2 is an isometric view of the driving device assembled to a base of FIG. 1.
Figure 3:
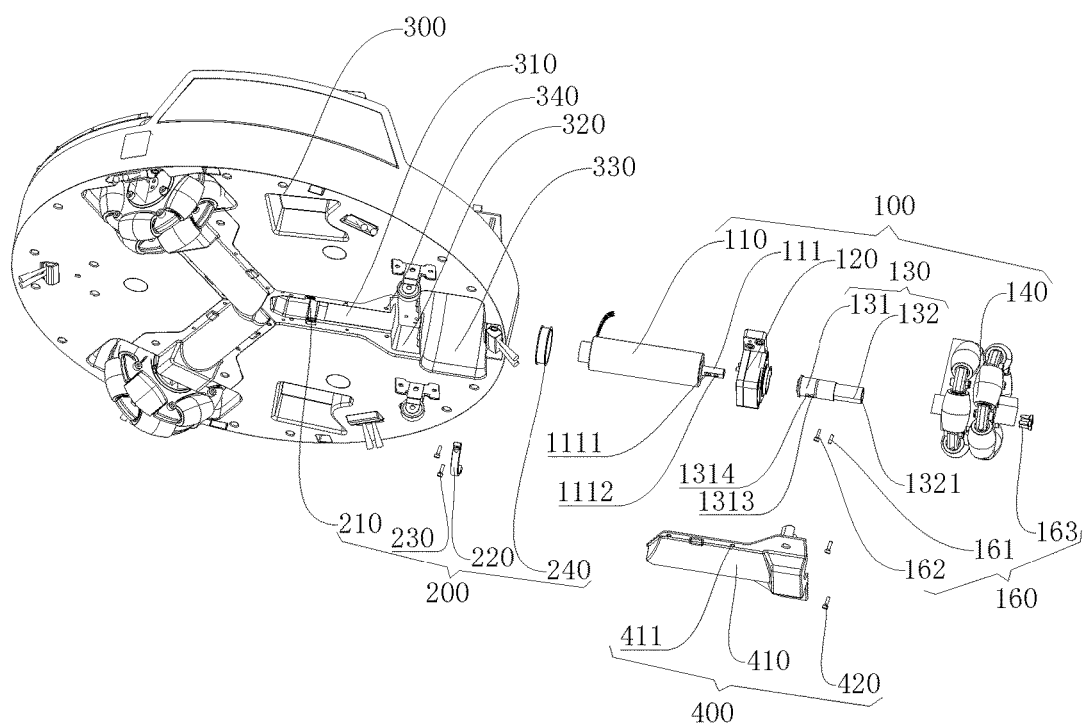
FIG. 3 an isometric partially exploded view of the assembly of FIG. 3.
Figure 4:
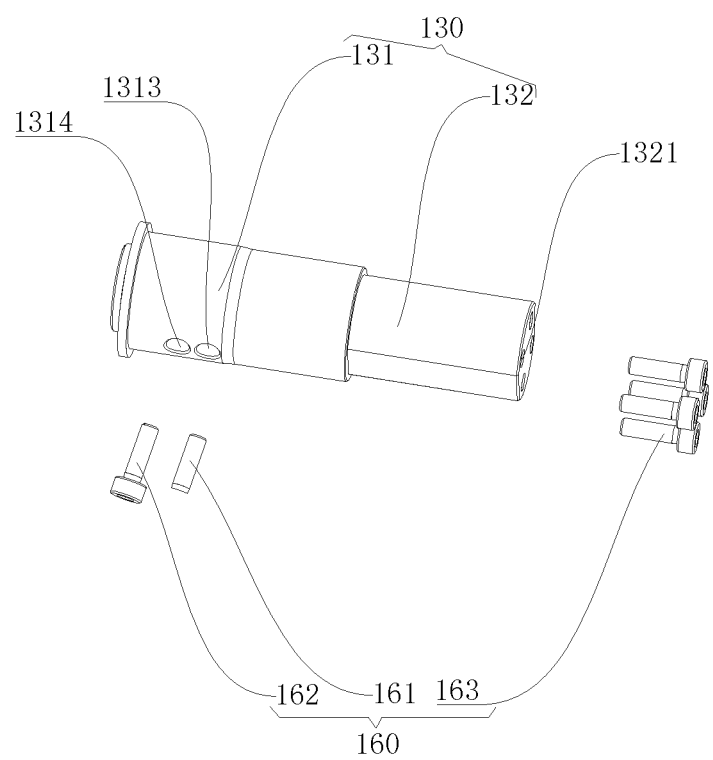
FIG. 4 is an enlarged view of the connection shaft and the connection assembly of FIG. 3.
Figure 5:
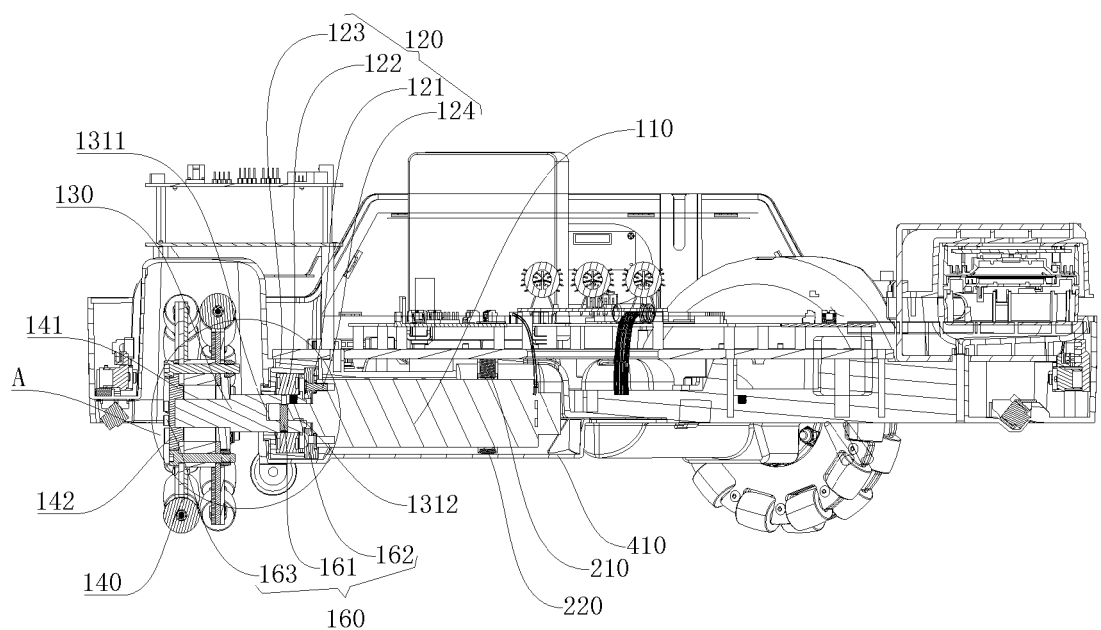
FIG. 5 is a planar sectional view of the driving device of FIG. 1.
Figure 6:
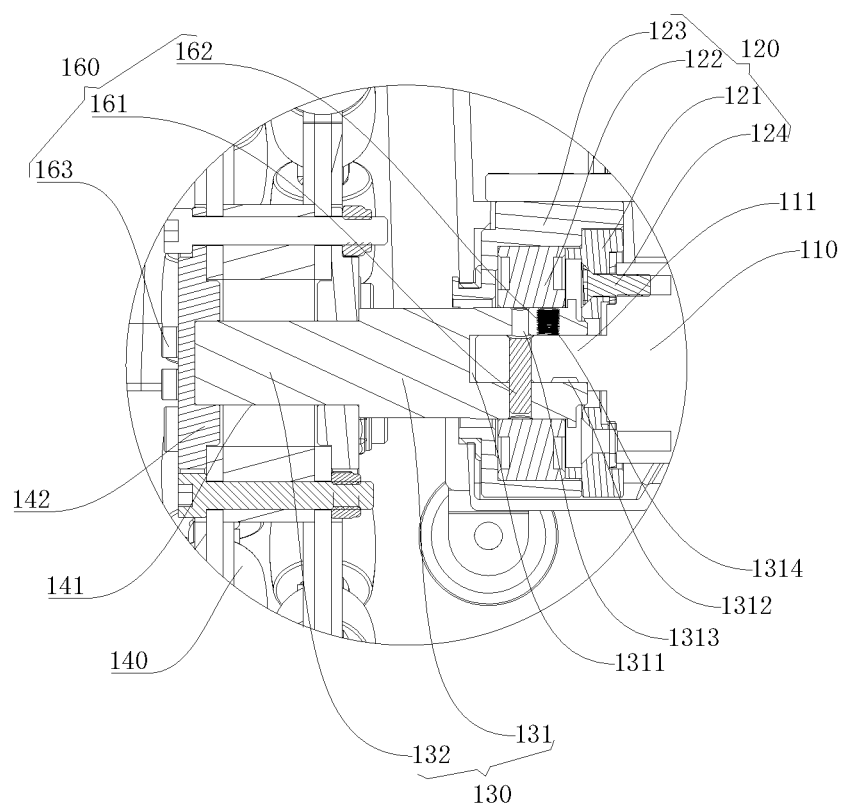
FIG. 6 is an enlarged view of the portion A of FIG. 5.

FIGS. 1-4 show a driving device for a wheeled robot. The driving device is arranged outside the base of the robot, and specifically at the lower surface of the base, for driving the robot to move with respect to a surface, such as ground. The driving device includes at least one driving assembly 100 and a fixing assembly 200 that are arranged outside a base 300 of the robot. In the embodiment, the fixing assembly 10 is used to fix the driving assembly to the lower surface of the base 300 that faces the surface. With such configuration, when the drive assembly 100 fails, the driving assembly 100 can be replaced without disassembling the base 300, making it easy to maintain the drive mechanism 100.

In the embodiment, the number of the at least one driving assembly 100 is three. Each driving assembly 100 includes a motor 110, an omnidirectional wheel 140, a connection shaft 130 used to connect an output shaft 111 of the motor 110 to the omnidirectional wheel 140, and a connection assembly 160 used to connect the connection shaft 130 to the motor 110 and the omnidirectional wheel 140. The motor 110, the connection shaft 130 and the omnidirectional wheel 140 are arranged along a radial direction of the base 300. Specifically, the output shaft 111 of the motor 110 is connected to the connection shaft 130 using the connection assembly 160 and the connection shaft 130 is connected to the omnidirectional wheel 140 so that the output shaft 111 can drive the omnidirectional wheel 140 connected to the connection shaft 130 to rotate when the motor 110 operates. A lateral surface of the output shaft ill of the motor 110 includes a first external planar surface that defines a positioning hole 1111 and a first limiting hole 1112.

In one embodiment, the drive assembly 100 further includes a motor control circuit board 150 arranged on the base 300. The 300 defines a through hole through which a signal line of passes so as to electrically connect the motor 110 arranged at the lower surface of the base 300 to the motor control circuit board 150, which allows the motor control circuit board 150 to drive the motor 110. It is to be understood that the motor control circuit board 150 is connected to at least two drive assemblies 100 to control the omnidirectional wheel 140 of each drive assembly 100 to rotate by means of preset control logic.

A hub of the omnidirectional wheel 140 defines a mounting hole 141 having an inner side surface that comprises a first inner planar surface. The omnidirectional wheel 140 further includes a side plate 142 arranged at one end of the hub and defining a through hole therein. The side plate 142 is engaged with the connection assembly 160 so as to fix the connection shaft 130 to the omnidirectional wheel 140.

The connection shaft 130 includes a first end 131 connected to the motor 110 and a second end 132 connected to the omnidirectional wheel 140. The first end 131 and the second end 132 are of different size and shape. The first end 131 defines a receiving hole 1311 that allows the output shaft 110 to be inserted thereinto. The receiving hole 131 has an inner surface including a second inner planar surface engaged with the first external planar surface of output shaft 111 so as to prevent the output shaft 111 from rotating with respect to the connection shaft 130 and allows the output shaft 111 to drive the connection shaft 130 to rotate. Further, the second inner planar surface includes a protrusion 1312 matching the positioning hole 1111. When the output shaft 111 is inserted into the receiving hole 3111, the protrusion 1312 is received in the positioning hole 1111, thereby holding the output shaft 111 and the connection shaft 130 in position. The connection shaft 130 defines a second limiting hole 1313 and a first threaded hole 1314 intersecting with the receiving hole 1311 in a lateral surface thereof. When the protrusion 1312 is received in the positioning hole 1111, the first limiting hole 1112 faces the second limiting hole 1313.

The connection assembly 160 includes a pin 161 matching the first limiting hole 1112 and the second limiting hole 1313. Specifically, the pin 161 is fitted in the second limiting hole 1313 and the limiting hole 1112 so as to prevent the output shaft 111 of the motor 110 from moving with respect to the connection shaft 130, thereby connecting the output shaft 111 to the connection shaft 130. The length of the pin 161 is equal to or less than the sum of the length of the first limiting hole 1112 and the length of the second limiting hole 1313. The pin 161 can thus be completely received in the space provided by the first limiting hole t 112 and the second limiting hole 1313, and no addition space is required for the pin 161, which is conducive to the compactness of the driving assembly 100.

The connection assembly 160 further includes a first screw 162 used to be engaged with the first threaded hole 1314. During the process of connecting the output shaft 111 to the connection shaft 130, the output shaft 111 is first inserted into the receiving hole 1311 of the connection shaft 130, with the protrusion 1312 in the receiving hole 1311 be received in the positioning hole 1111 of the output shaft 111. The pin 161 is then inserted into first limiting hole 1112 and the second limiting hole 1313. The second screw 162 is then turned into the first threaded hole 1314 in the lateral surface of the connection shaft 130 so as to stay in a tight contact with the output shaft 111, which serves as another connection means to connect the output shaft 111 to the connection shaft 130. With such configuration, it can avoid the occurrence that the connection between the output shaft 111 and the connection shaft 130 becomes loose or the output shaft 111 is disengaged from the connection shaft 130. In the embodiment, the first threaded hole 131 faces the protrusion 1312 so as to ensure the locking effect.

In one embodiment, the end surface of the second end 132 defines a second threaded hole 1321 that is used to be engaged with the connection assembly 160 to fix the omnidirectional wheel 140 to the connection shaft 130. Specifically, connection assembly 160 further includes a second screw 163 that connects the omnidirectional wheel 140 to the connection shaft 130. During the process of connecting the omnidirectional wheel 140 to the connection shaft 130, the second end 132 of the connection shaft 130 is inserted into the mounting hole 141 at the center of the hub of the wheel 140, with a second external planar surface of the second end 132 be engaged with the first inner planar surface in the mounting hole 141 to prevent the second end 132 from rotating with respect to the wheel 140. The second screw 163 is then passed through a through hole (not shown) in the side plate 142 of the wheel 140 and turned into the second threaded hole 1321 in the connection shaft 130. The connection shaft 130 is thus fixedly connected to the omnidirectional wheel 140. In the embodiment, the second external planar surface is a portion of the lateral surface of the connection shaft 130. With such structure, the connection shaft 130 can drive the omnidirectional wheel 140 to rotate when the motor 110 operates.

In one embodiment, the driving assembly 100 includes a bearing device 120 fixed to the base 300 and proving a support to the output shaft 111 of the motor 110. The bearing device 120 can reduce the friction exerted on the output shaft 111 of the motor 110 and ensures the rotational accuracy of the output shaft 111. Specifically, the bearing device 120 includes an inner case 121, an outer case 123 and a bearing 122 arranged between the inner case 121 and the outer case 123. The inner case 121 is fixed to the motor 110. The bearing 122 defines a bearing hole that allows an end of output shaft 111 to pass therethrough. The outer case 123 is fixed to base 300.

In one embodiment, the inner case 121 defines a first through hole (not shown), and accordingly, the motor 110 defines a threaded hole 112. A screw 124 is passed through the first through hole and is engaged with the threaded hole 112 so as to fix the inner case 121 to the motor 110. A second through hole is defined in the outer case 123. Accordingly, a threaded hole is defined in the base 300. A screw is passed through the second through hole and then engaged with the threaded hole of the outer case 123 to fix the outer case 123 to the base 300. The outer case 123 is fixed to the base 300 by the screw to prevent the output shaft 111 of the motor 110 from being damaged due to excessive force exerted thereon, which improves the service life of the motor 110.

In the embodiment, each of the drive assembly 100 includes a motor 110, a bearing device 120, a connection shaft 130, and an omnidirectional wheel 140. The motor 110 and the bearing device 120 are fixed to the base 300. The output shaft 111 of the motor 110 passes through the bearing device 120 and is fixedly connected to the connection shaft 130 and controls the rotation of the omnidirectional wheel 140 through the connection shaft 130. In order to avoid that the stability of the movement of the robot is adversely affected due to the base 300 is too high, the base 300 of the robot defines in a lower surface a motor receiving space 310 for receiving the motor 110, a bearing receiving space 320 for receiving the bearing device 120 and a wheel receiving space 330 for receiving the omnidirectional wheel 140. During mounting, the motor 110, the bearing device 120 and the omnidirectional wheel 140 are respectively placed in the motor receiving space 310, the bearing receiving space 320 and the wheel receiving space 330. With such configuration, the axis of each of the motor 110, the bearing device 120, the connection shaft 130 and the omnidirectional wheel 140 is substantially parallel to the lower surface of the base 300, which can allow the base 300 to have a small height and is conducive to the stability of the movement of the robot.

In one embodiment, the fixing assembly 200 includes a first lock member 210, a second lock member 220 and a number of screws 230. The first lock member 210 is received in the motor receiving space 310 and defines a number of threaded holes. The second lock member 220 defines a number of through holes corresponding to the threaded holes of the first lock member 210. The screws respectively pass through the through holes of the second lock member 220 and are engaged with the threaded holes of the first lock member 210, which connects the first lock member 210 to the second lock member 220. The first lock member 210 and the second lock member 220 corporately define a through hole for holding the motor 110 in position.

In the embodiment, the first lock member 210 and the second lock member 220 each include a C-shaped body and two connecting portions at opposite ends of the body. One threaded hole is defined in each of the two connecting portions of the first lock member 210. The two connecting portions of the second lock member 220 each define a through hole. The two C-shaped bodies of the first lock member 210 and the second lock member 220 corporately form a through hole that holds the motor 110 in position. During mounting, the motor 110 is first placed in the hollow space defined by the body of the first lock member 210 and the second lock member 220 is connected to the first lock member 210 by screws 230 passing through the through holes of the second lock member 220 and engaged with the threaded holes in the first lock member. The first lock member 210 and the second lock member 220 are thus connected to each other and form the through hold that holding the motor 110 in position.

In one embodiment, the fixing assembly 200 further includes a soft ring 240 that is arranged around a lateral surface of the motor 110 and received in the through hole defined by the first lock member 210 and the second lock member 220. During assembling, the soft ring 240 is first arranged around the lateral surface of the motor 110. The motor 110 with the soft ring 240 is then placed in the space defined by the first lock member 210 and the second lock member 220 is then connected to the first lock member 220 by screws 230. The soft ring 240 is used to protect the motor 100 from being scratched.

In one embodiment, the driving device further includes a protecting structure 400 including a cover 410 connected to the lower surface of the base 300 of the robot. The cover 410 and the lower surface define corporately an accommodating space for receiving the motor 110 and the bearing device 120. The protecting structure 400 further includes a number of connecting screws 420 for fixing the cover 410 to the lower surface of the base 300. The cover 410 defines a number of connection through holes 411, and the base 300 defines accordingly a number of threaded holes 340. The connecting screws 420 pass through the connecting through holes 411 and are engaged with the threaded holes 340 to fix the cover 410 to the lower surface of the base 300.

The cover 410 is shaped according to the motor 110 and the bearing device 120, and defines a number of through holes 411 adjacent to the rim thereof. The threaded holes 340 are defined in the lower surface of the base 300 along the edges of the motor receiving space 310 and the bearing receiving space 320. After the drive structure 110 is fixed to the base 300 by the fixing assembly 200 and the bearing device 120 is fixed to the base 300, the cover 410 is then fixed to the base 300 by the screws 420, thereby protecting the motor 110 and the bearing device 120.

In one embodiment, the number of the at least one driving assembly 100 is three and are evenly arranged at the base 300 of the robot. It then requires three fixing assemblies 200. That is, the angle between the axes of each two driving assembles 100 is 120 degrees, and the angle between the axes of each two motors 110 is 120 degrees. With such configuration, the center of gravity of the robot lies at the axis passing through the center of the base 300 and perpendicular to the base 300, which can ensure the stability of movement of the robot, and avoid the occurrence of shaking during the movement. It is to be understood that when the number of the driving assemblies 100 is four or more, the angel between the axes of each two adjacent driving assemblies 100 is equal to the quotient of 360 degrees divided by the number of the driving assemblies 100. The internal control logic of the robot is associated with the number of drive assemblies 100.

The drive assemblies 100 are fixed to the outside of the base 300 by the fixing assemblies 200. When one driving assembly 100 fails, the driving assembly 100 can be replaced without disassembling the base 300, making it easy to maintain the drive mechanism 100.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A driving device of a robot comprising at least one driving assembly and a fixing assembly that are arranged outside a base of the robot, wherein the at least one driving assembly comprises a motor, an omnidirectional wheel, a connection shaft configured to connect an output shaft of the motor to the omnidirectional wheel, and a connection assembly configured to connect the connection shaft to the motor and the omnidirectional wheel, the motor, the connection shaft and the omnidirectional wheel are arranged along a radial direction of the base, and the fixing assembly is configured to fix the motor to the base of the robot, wherein a lateral surface of the output shaft of the motor comprises a first external planar surface that defines a positioning hole, a hub of the omnidirectional wheel defines a mounting hole having an inner side surface that comprises a first inner planar surface, the connection shaft comprises a first end and a second end, the first end defines a receiving hole that allows the output shaft to be inserted thereinto and has an inner surface comprising a second inner planar surface, the second inner planar surface comprises a protrusion matching the positioning hole, and the second end has a lateral surface comprising a second external planar surface matching the first inner planar surface.

2. The driving device structure of claim 1, wherein the first external planar surface defines a first limiting hole, the omnidirectional wheel comprises a side plate defining a through hole, the connection shaft defines in a lateral surface thereof a second limiting hole and a first threaded hole intersecting with the receiving hole, an end surface of the second end defines a second threaded hole, the connection assembly comprises a pin, a first screw and a second screw, the pin is inserted in to the first limiting hole and the second limiting hole, the first screw is engaged with the first threaded hole, and the second screw passes through the through hole and is engaged with the second threaded hole.

3. The driving device of claim 1, wherein the at least one driving assembly comprises a bearing device fixed to the base of the robot and providing a support to the output shaft of the motor.

4. The driving device of claim 3, wherein the bearing device comprises an inner case, an outer case and a bearing arranged between the inner case and the outer case, the inner case is fixed to the motor, the bearing defines a bearing hole that allows an end of output shaft to pass therethrough, and the outer case is fixed to base of the robot.

5. The driving device of claim 4, wherein the base of the robot defines in a lower surface a motor receiving space for receiving the motor, a bearing receiving space for receiving the bearing device and a wheel receiving space for receiving the omnidirectional wheel.

6. The driving device of claim 5, wherein the fixing assembly comprises a first lock member, a second lock member and a plurality of screws, the first lock member is received in the motor receiving space and defines a plurality of threaded holes, the second lock member defines a plurality of through holes corresponding to the threaded holes of the first lock member, the screws respectively pass through the through holes of the second lock member and are engaged with the threaded holes of the first lock member, and the first lock member and the second lock member corporately define a through hole for bolding the motor in position.

7. The driving device of claim 6, wherein the fixing assembly further comprises a soft ring that is arranged around a lateral surface of the motor and received in the through hole defined by the first lock member and the second lock member.

8. The driving device of claim 5 further comprising a protecting structure, wherein the protecting structures comprises a cover connected to the lower surface of the base of the robot, and the cover and the lower surface define corporately an accommodating space for receiving the motor and the bearing device.

9. The driving device of claim 1, wherein a number of the at least one driving assembly is three and are evenly arranged at the base of the robot.

10. A wheeled robot comprising a base and a driving device comprising at least one driving assembly and a fixing assembly that are arranged outside the base, wherein the at least one driving assembly comprises a motor, an omnidirectional wheel, a connection shaft configured to connect an output shat of the motor to the omnidirectional wheel, and a connection assembly configured to connect the connection shat to the motor and the omnidirectional wheel, the motor, the connection shaft and the omnidirectional wheel are arranged along a radial direction of the base, and the fixing assembly is configured to fix the motor to the base, wherein a lateral surface of the output shaft of the motor comprises a first external planar surface that defines a positioning hole, a hub of the omnidirectional wheel defines a mounting hole having an inner side surface that comprises a first inner planar surface, the connection shaft comprises a first end and a second end, the first end defines a receiving hole that allows the output shaft to be inserted thereinto and has an inner surface comprising a second inner planar surface, the second inner planar surface comprises a protrusion matching the positioning hole, and the second end has a lateral surface comprising a second external planar surface matching the first inner planar surface.

11. A driving device of a robot comprising at least one driving assembly and a fixing assembly that are arranged outside a base of the robot, wherein the at least one driving assembly comprises a motor, an omnidirectional wheel, a connection shaft configured to connect an output shaft of the motor to the omnidirectional wheel, and a connection assembly configured to connect the connection shaft to the motor and the omnidirectional wheel, the motor, the connection shaft and the omnidirectional wheel are arranged along a radial direction of the base, and the fixing assembly is configured to fix the motor to the base of the robot, wherein the at least one driving assembly further comprises a bearing device fixed to the base of the robot, the bearing device comprises a bearing hole configured to receive and support the connection shaft and the output shaft, the bearing hole has a radial inner surface arranged to surround a periphery of the connection shaft.

12. The driving device of claim 11, wherein a lateral surface of the output shaft of the motor comprises a first external planar surface that defines a positioning hole, a hub of the omnidirectional wheel defines a mounting hole having an inner side surface that comprises a first inner planar surface, the connection shaft comprises a first end and a second end, the first end defines a receiving hole that allows the output shaft to be inserted thereinto and has an inner surface comprising a second inner planar surface, the second inner planar surface comprises a protrusion matching the positioning hole, and the second end has a lateral surface comprising a second external planar surface matching the first inner planar surface.

13. The driving device structure of claim 12, wherein the first external planar surface defines a first limiting hole, the omnidirectional wheel comprises a side plate defining a through hole, the connection shaft defines in a lateral surface thereof a second limiting hole and a first threaded hole intersecting with the receiving hole, an end surface of the second end defines a second threaded hole, the connection assembly comprises a pin, a first screw and a second screw, the pin is inserted in to the first limiting hole and the second limiting hole, the first screw is engaged with the first threaded hole, and the second screw passes through the through hole and is engaged with the second threaded hole.

14. The driving device of claim 11, wherein the bearing device comprises an inner case, an outer case and a bearing arranged between the inner case and the outer case, the inner case is fixed to the motor, the bearing hole is arranged in the bearing, and the outer case is fixed to base of the robot.

15. The driving device of claim 14, wherein the base of the robot defines in a lower surface a motor receiving space for receiving the motor, a bearing receiving space for receiving the bearing device and a wheel receiving space for receiving the omnidirectional wheel.

16. The driving device of claim 15, wherein the fixing assembly comprises a first lock member, a second lock member and a plurality of screws, the first lock member is received in the motor receiving space and defines a plurality of threaded holes, the second lock member defines a plurality of through holes corresponding to the threaded holes of the first lock member, the screws respectively pass through the through holes of the second lock member and are engaged with the threaded holes of the first lock member, and the first lock member and the second lock member corporately define a through hole for holding the motor in position.

17. The driving device of claim 16, wherein the fixing assembly further comprises a soft ring that is arranged around a lateral surface of the motor and received in the through hole defined by the first lock member and the second lock member.

18. The driving device of claim 15 further comprising a protecting structure, wherein the protecting structurer comprises a cover connected to the lower surface of the base of the robot, and the cover and the lower surface define corporately an accommodating space for receiving the motor and the bearing device.

19. The driving device of claim 11, wherein a number of the at least one driving assembly is three and are evenly arranged at the base of the robot.

* * * * *